(12) United States Patent
Leadlay

(10) Patent No.: US 6,948,666 B1
(45) Date of Patent: Sep. 27, 2005

(54) FILTERING APPARATUS

(76) Inventor: Katharine J. Leadlay, 10 Donnamora Crescent, Thornhill, ON (CA), L3T 4K5

( * ) Notice: Subject to any disclaimer, the term of this patent is extended or adjusted under 35 U.S.C. 154(b) by 0 days.

(21) Appl. No.: 10/441,304

(22) Filed: May 15, 2003

(51) Int. Cl.⁷ .................................. B05B 1/30
(52) U.S. Cl. ............... 239/575; 239/558; 239/377; 239/315; 239/310; D23/212
(58) Field of Search ............... 239/575, 557, 239/558, 375, 377, 310, 315; D23/212

(56) References Cited

U.S. PATENT DOCUMENTS

| 1,945,701 | A | * | 2/1934 | Pearl | 239/312 |
| 2,690,930 | A | * | 10/1954 | Corson | 239/315 |
| 2,986,340 | A | * | 5/1961 | Webb | 239/315 |
| 3,777,982 | A | * | 12/1973 | Britton | 239/315 |
| 4,948,499 | A | * | 8/1990 | Peranio | 210/180 |
| 5,779,154 | A | * | 7/1998 | Martin | 239/315 |

FOREIGN PATENT DOCUMENTS

JP 06-090629 * 4/1994

* cited by examiner

Primary Examiner—Dinh Q. Nguyen

(57) ABSTRACT

A filtering apparatus for use with threaded nipples or sprinkling cans having dispensing spouts and a base and cap. The base has a neck and head. The neck features an upper end and a lower end wherein the lower end is fittable to the dispensing end of a sprinkling can spout. The neck further includes a lower chamber in fluid communication with the dispensing end of the sprinkling can spout such that the lower chamber can receive a filtering element therewithin. Preferably, the head is hollow and includes a threaded open upper periphery and a lower surface in fluid communication with upper end of the neck. Finally, a removable perforated cap is provided for dispensing fluid. The cap has a threaded lower periphery cooperable with the threaded open upper periphery of the hollow head for forming an upper chamber in fluid communication with the neck for receiving granular or wafer born elements.

4 Claims, 1 Drawing Sheet

FILTERING APPARATUS

BACKGROUND OF THE INVENTION

1. Field of the Invention

The present invention relates to a new and improved filtering apparatus and, more particularly, pertains a filtering apparatus for use in connection with watering flora, such as via attachment to sprinkling cans having dispensing spouts.

2. Description of the Prior Art

The use of filtering apparatus of known designs and configurations is known in the prior art. More specifically, filtering apparati of known designs and configurations heretofore devised and utilized for the purpose of filtering water through known methods and apparatuses are known to consist basically of familiar, expected, and obvious structural configurations, notwithstanding the myriad of designs encompassed by the crowded prior art which has been developed for the fulfillment of countless objectives and requirements.

The prior art discloses a large number of filtering apparatus of known designs and configurations. By way of example, U.S. Pat. No. 4,678,571 to Hosaka et al. discloses a water purifier having a deodorizing tank for removing ions and odorants by absorption from running water and a mesh filter for removing dust.

U.S. Pat. No. 1,699,459 to Ullrich discloses a sprinkling can with a removable perforated cap.

U.S. Pat. No. 4,647,375 to Czeller et al. discloses an apparatus for universal water treatment with cylindrical housing and rotating ring baskets.

U.S. Pat. No. 4,305,826 to Moses discloses a method and apparatus for softening and filtering water utilizing a multilayer filter.

U.S. Pat. No. 5,151,179 to Bach et al. discloses a faucet connected water filter having two tubular hollow legs depending from a base member with a coupler for attaching the unit to a faucet spout.

In this respect, the filtering apparatus according to the present invention substantially departs from the conventional concepts and designs of the prior art, and in doing so provides an apparatus primarily developed for the purpose of a filtering apparatus for use with sprinkling cans having dispensing spouts.

Therefore, it can be appreciated that there exists a continuing need for a new and improved filtering apparatus that can be used for treating water dispensed from sprinkling cans. In this regard, the present invention substantially fulfills this need.

SUMMARY OF THE INVENTION

In view of the foregoing disadvantages inherent in the known types of filtering apparatus of known designs and configurations now present in the prior art, the present invention provides a new and improved filtering apparatus. As such, the general purpose of the present invention, which will be described subsequently in greater detail, is to provide a new and improved filtering apparatus and methods that have all the advantages of the prior art and none of the disadvantages.

To attain this, the present invention essentially comprises a new and improved filtering apparatus device for treating water dispensed from sprinkling cans. The device includes a base and cap. The base is formed of a neck and head. The neck features an upper end and a lower end wherein the lower end is fittable to the dispensing end of a sprinkling can spout. The neck further includes a lower chamber in fluid communication with the dispensing end of the sprinkling can spout such that the lower chamber can receive a filtering element therewithin.

The device also includes a hollow head with a threaded open upper periphery and a lower surface in fluid communication with upper end of the neck.

Finally, a removable perforated cap is provided for dispensing fluid. The cap has a threaded lower periphery cooperable with the threaded open upper periphery of the hollow head. When coupled the cap and head for an upper chamber in fluid communication with the neck. The upper chamber may receive granular or wafer born elements therewithin.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved filtering apparatus that has all the advantages of the prior art filtering apparatus of known designs and configurations and none of the disadvantages.

It is another object of the present invention to provide a new and improved filtering apparatus that may be easily and efficiently manufactured and marketed.

It is a further object of the present invention to provide a new and improved filtering apparatus that is of a durable and reliable construction.

It is yet a further object of the present invention to provide a new and improved filtering apparatus that may be readily sterilized for improved sanitation.

An even further object of the present invention is to provide a new and improved filtering apparatus which is susceptible of a low cost of manufacture with regard to both materials and labor, and which accordingly is then susceptible of low prices of sale to the consuming public, thereby making such a filtering apparatus economically available to the buying public.

Even still another object of the present invention is to filter and treat water dispensed from a sprinkling can.

Lastly, it is an object of the present invention to provide a filtering apparatus for use with sprinkling cans having dispensing spouts comprising a base and cap. The base has a neck and head. The neck featuring an upper end and a lower end wherein the lower end is fittable to the dispensing end of a sprinkling can spout. The neck further including a lower chamber in fluid communication with the dispensing end of the sprinkling can spout such that the lower chamber can receive a filtering element therewithin. The head being hollow and including a threaded open upper periphery and a lower surface in fluid communication with upper end of the neck. A removable perforated cap is provided for dispensing fluid. The cap has a threaded lower periphery cooperable with the threaded open upper periphery of the hollow head for forming an upper chamber in fluid communication with the neck for receiving granular elements.

These together with other objects of the invention, along with the various features of novelty that characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts throughout the various Figures.

DESCRIPTION OF THE PREFERRED EMBODIMENT

Figure 1:
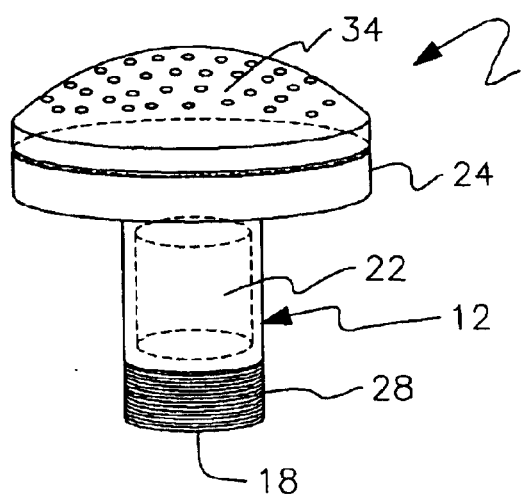
FIG. 1 is perspective view of the filtering apparatus constructed in accordance with the principles of the present invention.
Figure 2:
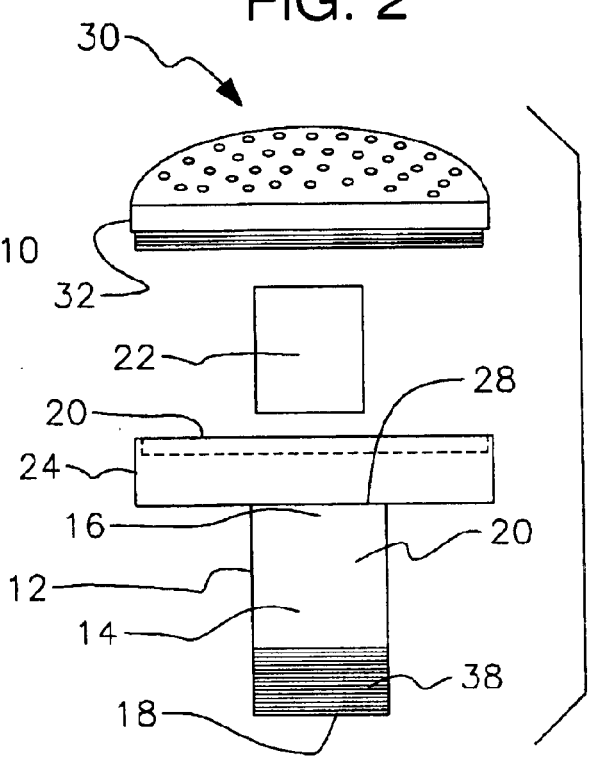
FIG. 2 is an exploded side elevational view of the present invention.
Figure 3:
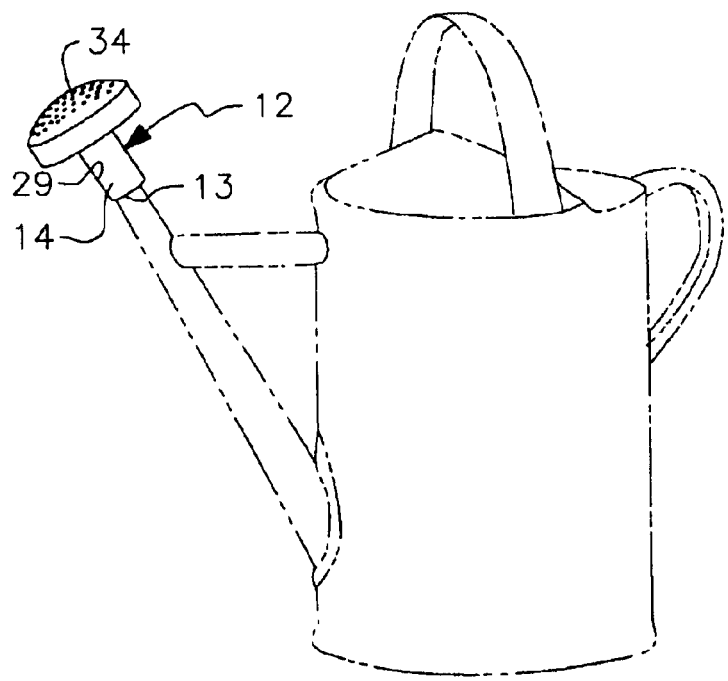
FIG. 3 is a view of the present invention fitted to a conventional sprinkling can.

With reference now to the drawings, and in particular to FIG. 1 thereof, the preferred embodiment of the new and improved filtering apparatus embodying the principles and concepts of the present invention and generally designated by the reference numeral 10 will be described.

The present invention, the new and improved filtering apparatus, is a device 10 comprised of a plurality of components. Such components, in their broadest context, include a base and cap. Each of the individual components is specifically configured and correlated one with respect to the other so as to attain the desired objectives.

The first component of the new and improved filtering apparatus 10 for filtering and treating water dispensed from a sprinkling can having a dispensing spout is a base 12. The base includes a neck 14. The neck has an upper end 16 and a lower end 18. The lower end is fittable to the dispensing end of a sprinkling can spout.

Further, the neck further forms a lower chamber 20. The lower chamber is in fluid communication with the dispensing end of the sprinkling can spout. The lower chamber receives a filtering element 22 therewithin. The filtering element may be of an activated carbon type for filtering water dispensed from the sprinkling can. This allows impurities in the water, or chemicals, such as chlorine, added for water transmission safety that could have an adverse affect on flora, to be purified and filtered.

The base further includes a hollow head 24. The hollow head includes a threaded open upper periphery 26 and a lower surface 28. The lower surface is in fluid communication with upper end of the neck.

The filtering apparatus forming the present invention also includes a removable perforated cap 30 for dispensing fluid. The cap includes a threaded lower periphery 32. The threaded lower periphery is cooperable with the threaded open upper periphery of the hollow head for forming an upper chamber 34 when mated. The upper chamber is in fluid communication with the neck and thereby the dispensing end of the sprinkling can spout. The upper chamber can receive either granular elements or wafer born chemicals elements therewithin for treating dispensed water with fertilizer or the like.

Finally, the lower end of the neck comprising the filtering device the present invention includes an exterior threaded region 38. The exterior threaded region allows the present invention to be coupled to a conventional threaded faucet, hose, sprinkler or the like for allowing fluids dispensed therefrom to be filtered and treated.

The filtering apparatus forming the present invention may be coupled to an existing water source, such as a sprinkling can, threaded faucet, hose, sprinkler or the like, or any other threaded nipple for filtering water dispensed therefrom via a filtering element contained within the lower chamber. The filtering apparatus forming the present invention is similar to a standard sprinkling can, but it has a larger head to hold granular elements such as fertilizers or wafer born chemicals for also allowing the present invention to chemically treat water dispensed therethrough. The present invention can be embodied as a disposable attachment for a water source or as a unit capable of having its filter replaced.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A new and improved filtering apparatus for use with threaded nipples or sprinkling cans having dispensing spouts comprising, in combination:

a base, the base including a neck, the neck having an upper end and a lower end fittable to the dispensing end of a sprinkling can spout, wherein the neck further includes a lower chamber in fluid communication with the dispensing end of the sprinkling can spout for receiving an activated carbon filtering element capable of removing unwanted chemicals from water therewithin, the lower end of the neck further including exterior threads, the base further including a hollow head, the hollow head having a threaded open upper periphery and a lower surface in fluid communication with the upper end of the neck; and a removable perforated cap for dispensing fluid, the cap having a threaded lower periphery cooperable with the threaded open upper periphery of the hollow head for forming an upper chamber in fluid communication with the neck for receiving chemical treatment elements that dispense fertilizer and are selected from the group consisting of granular type chemical treatment elements and wafer-type chemical treatment elements.

2. A new and improved filtering apparatus for use with threaded nipples or sprinkling cans having dispensing spouts comprising, in combination:

a base including a neck and a hollow head wherein the neck has an upper end and a lower end, the lower end fittable to the dispensing end of a sprinkling can spout, wherein the neck further includes a lower chamber in fluid communication with the dispensing end of the sprinkling can spout for receiving an activated carbon filtering element capable of removing unwanted chemicals from water within the lower chamber and the hollow head has a threaded open upper periphery and a lower surface, the lower surface in fluid communication with the upper end of the neck; and a removable perforated cap fittable to the hollow head for dispensing fluid wherein the cap has a threaded lower periphery cooperable with the threaded open upper periphery of the hollow head for forming a chamber in fluid communication with the neck for receiving chemical treatment elements that dispense fertilizer.

3. The new and improved filtering apparatus for use with threaded nipples or sprinkling cans as set forth in claim 2 wherein the lower end of the neck includes exterior threads.

4. The new and improved filtering apparatus for use with sprinkling cans as set forth in claim 2 wherein said chemical treatment elements are selected from the group consisting of granular-type chemical treatment elements and wafer-type chemical treatment elements.

* * * * *